(12) United States Patent
Sudan

(10) Patent No.: US 6,632,912 B2
(45) Date of Patent: Oct. 14, 2003

(54) PROCESS FOR PREPARING A BLACK LIQUOR-PHENOL FORMALDEHYDE THERMOSET RESIN

(75) Inventor: Vikrant Sudan, Oakville (CA)

(73) Assignee: Silvachem, Inc., Montreal (CA)

( * ) Notice: Subject to any disclaimer, the term of this patent is extended or adjusted under 35 U.S.C. 154(b) by 18 days.

(21) Appl. No.: 10/225,664

(22) Filed: Aug. 22, 2002

(65) Prior Publication Data

US 2003/0045665 A1 Mar. 6, 2003

(30) Foreign Application Priority Data

Aug. 24, 2001 (CA) .............................................. 2355808

(51) Int. Cl.[7] .............................. C08H 5/02; C08H 5/00
(52) U.S. Cl. ....................... 527/403; 527/400; 530/501; 530/502
(58) Field of Search ................................ 527/400, 403; 530/500, 501, 502

(56) References Cited

U.S. PATENT DOCUMENTS 3,597,375 A * 8/1971 Ludwig et al. ............. 524/799
3,658,638 A * 4/1972 Ludwig et al. ............. 428/529
3,864,291 A * 2/1975 Enkvist ...................... 524/799
4,537,941 A    8/1985 Kambanis et al.
4,769,434 A * 9/1988 Van der Klashorst et al. ... 527/403

* cited by examiner

Primary Examiner—James J. Seidleck
Assistant Examiner—Thao Tran
(74) Attorney, Agent, or Firm—Baker & Daniels

(57) ABSTRACT

Disclosed is a process for preparing phenol-formaldehyde thermoset resin that can contain up to 80% by weight a black liquor, preferably a sodium carbonate black liquor. Black liquor are by-products extracted from pulping process, which normally contain lignosulfonates, kraft lignin or sodium carbonate lignin as well as salts, depending on the process that is used. The use of such a black liquor permits to obtain a stable copolymerized phenol-formaldehyde thermoset resin. In the process, the black liquor is first mixed with phenol in the pressure of a base. Then, formaldehyde is added together with a base in two successive steps. The obtained thermoset resin has bonding properties that meet or exceed the CSA and ASTM requirements for the engineered forest products, such as wafer boards or oriented strand boards at pressing cycles of 16 mm per second or less.

20 Claims, 2 Drawing Sheets

PROCESS FOR PREPARING A BLACK LIQUOR-PHENOL FORMALDEHYDE THERMOSET RESIN

FIELD OF THE INVENTION

The present invention relates to a process for preparing a black liquor-phenol formaldehyde thermoset resin for use in the engineered forest products industry.

The invention also relates to the so prepared resin wherein phenol and formaldehyde are copolymerized with lignin found in a black liquor, and more preferably a sodium carbonate black liquor, which is extracted from a pulping process. Such lignin includes lignosulfonates, kraft lignin and/or sodium carbonate lignin.

The so prepared resin can be used in liquid state or it can be converted into a powder by spray drying. It is particularly useful as a binder for engineered forest products, such as wafer boards, oriented strand boards (OSB), plywood and the like.

DESCRIPTION OF THE PRIOR ART

Currently, phenol-formaldehyde (phenolic) thermoset resins are used as binders (viz. adhesives) in the engineered forest products industry. When cured, these thermoset resins bond wood chips or veneers to each other under heat and pressure. For most wood based applications, the phenolic resins that are used are Resole type resins, the pH of which is above 7 and the mole ratio of formaldehyde to phenol is greater than 1.

It is also known that black liquors, or lignins extracted from black liquors, can be copolymerized or cold mixed with phenolic resins for use in the plywood and OSB industry (see, for example, U.S. Pat. No. 4,537,941). The use of black liquors arises from the fact that black liquors contain lignin, which is a polymer containing phenolic groups with reactive sites for further polymerization. Since the black liquor is a by-product of the pulping process, the cost of the liquor is substantially lower than phenol. However, recent advancement in pressing technology has reduced from 25 seconds per millimeter to 16 seconds or less per millimeter the time required in the press to make OSB panels under elevated pressure and temperature. Because of such a reduction in time in the press cycle, the existing black liquor modified resins may not meet the CSA and ASTM standards for internal bond strength. Moreover, the existing black liquor modified resins contain small amounts of black liquor which make them economically less attractive.

SUMMARY OF THE INVENTION

It has now been discovered that by following a very specific sequence of steps, one may prepare a black liquor-phenol formaldehyde thermoset resin having improved properties as compared to those that have been prepared and used so far.

Thus, a main object of the present invention is to provide a process for preparing a black liquor-phenol formaldehyde thermoset resin, comprising the steps of:

a) mixing a black liquor with phenol and a base and letting the so obtained mixture reacts at high temperature;

b) cooling the mixture obtained in step a), then adding to it a given amount of formaldehyde and letting the so obtained mixture reacts; and c) adding an additional amount of formaldehyde and a base to the mixture obtained in step b) in order to obtain the requested resin, such an additional amount being selected so that there is an excess of free formaldehyde in solution when the requested resin of given viscosity or molecular weight is obtained.

Preferably, in step a, the black liquor, phenol and base are mixed altogether and then the so obtained mixture is heated and kept to react.

Alternatively however, in step a):

$a_1$) the black liquor is first mixed with phenol;

$a_2$) the mixture obtained in sub-step $a_1$) is heated;

$a_3$) the base is then added to the mixture obtained in sub-step $a_2$); and $a_4$) the mixture obtained in sub-step $a_3$) is kept to react.

Preferably also, the black liquor used as starting material is a sodium carbonate black liquor. However, other kind of black liquors could alternatively be used, such as those obtained via a bisulfite process that contains lignosulfonates or via a Kraft process which uses sodium sulfide and sodium hydroxide as active alkali (Kraft lignin). However, sodium carbonate black liquor is preferred because of its reactivity and availability.

With this method, the amount of black liquor that is used, can be up to 80% by weight of the total weight of the resin (the preferred range being 40% and higher by weight of the total weight of the resin) and still meet the CSA and ASTM requirements for bond strength in Oriented Strand Board (OSB) and plywood.

Preferably also, the above method may also comprise the additional step of reacting the resin that has been obtained with urea.

Another object of the invention is the black liquor-phenol formaldehyde thermoset resin obtained by the above process.

A further object of the invention is the use of the above black liquor-phenol formaldehyde thermoset resin as a binder for engineered forest products. Preferably, prior to such a use, a potassium carbonate solution can be added to the resin so that it cures faster.

The invention and its advantages will be better understood upon reading the following non-restrictive description of it and accompanying examples.

DETAILED DESCRIPTION OF THE INVENTION

Figure 1:
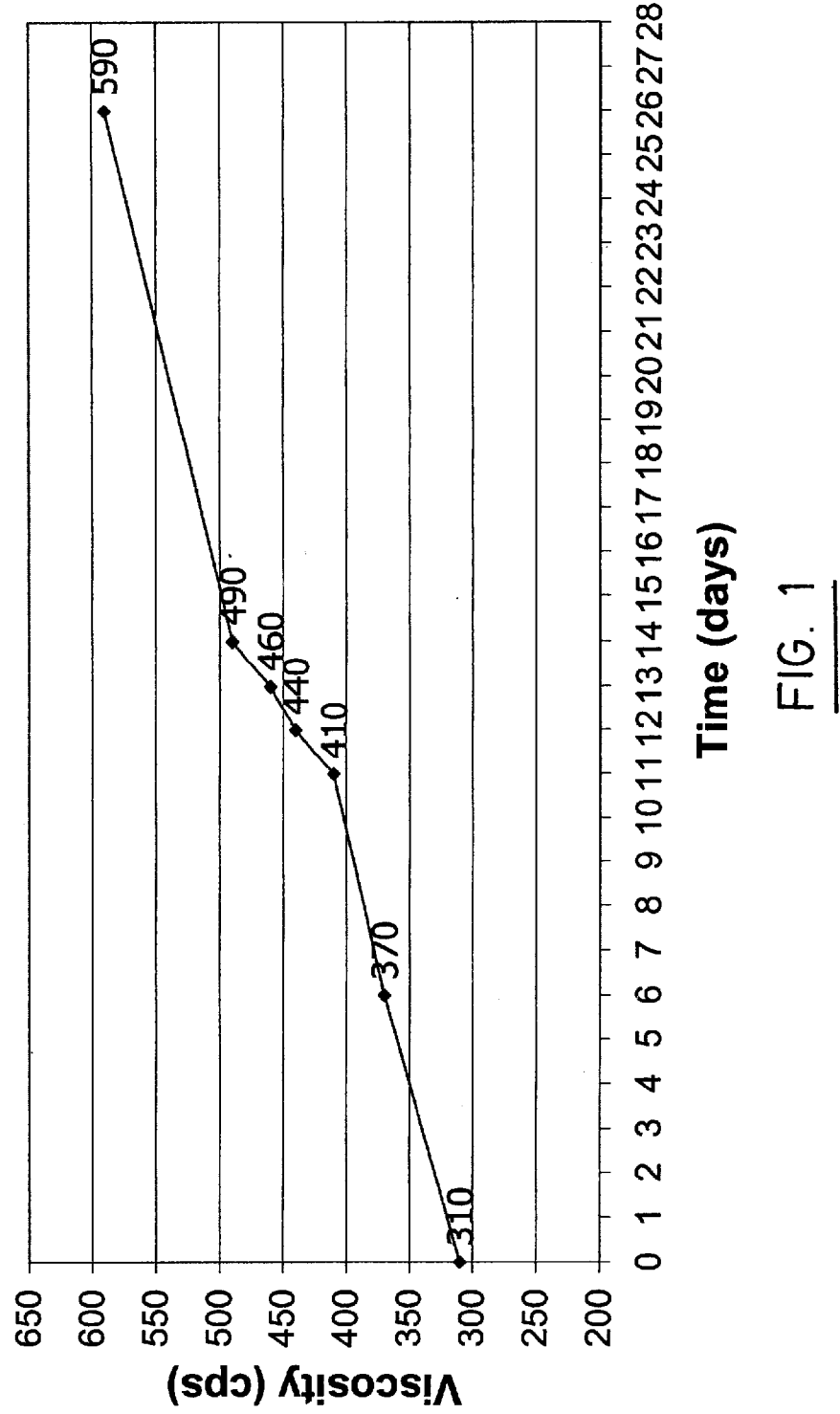
FIG. 1 is a chart giving the viscosity as a function of the time of a black liquor-phenol-formaldehyde resin according to the invention.

Phenol and formaldehyde are known to be two chemicals that when mixed together, react to form a polymer and water. Because the reaction forms water, it is called a condensation reaction. At room temperature, the reaction occurs very slowly but as the temperature is raised, it proceeds at a faster rate. The polymer formation is closely related to the amount of formaldehyde that is available and to the pH at which the reaction is carried out. At low pH (viz. lower than 7) the polymer tends to be mostly a linear type molecule: reactions occur on the two ortho positions of the phenol ring. As the pH increases, the chances of para-addition to the phenol ring increases and cross-linking begins.

In low pH and usually with mole ratios of formaldehyde to phenol of less than 1, the resin is called NOVOLAK. At higher pH viz. higher than 7 with mole ratio, as above, of greater than 1 the resin is called RESOL. If the pH is higher than 7 and the mole ratio is 1 to 1.5, then the resin will cross-link but not fully and not very rapidly. This makes for a poor high strength binder. If the pH is lower than 7 and the mole ratio is higher than 1, then the resin will cross-link in the presence of an acid catalyst and the cost of the resin will increase dramatically.

The basic purpose of the present invention is to formulate a phenol formaldehyde resin with the highest possible amount of the black liquor preferably sodium carbonate black liquor.

More specifically, the basic purpose of the present invention is to provide a process for preparing a thermoset resin wherein a black liquor, preferably a sodium carbonate black liquor, is used in significant amount to copolymerize with phenol and formaldehyde.

As aforesaid, the amount of black liquor that is used, can be up to 80% by weight of the total weight of the resin (the preferred range being 40% or higher by weight of the total weight of the resin) and still meet the CSA and ASTM requirements for bond strength in Oriented Strand Board (OSB) and plywood.

The use of black liquor advantageously reduces the amount of phenol and formaldehyde solids required to form the resin. In this connection, it is worth noting that the black liquor does not replace phenol or formaldehyde but reacts with the same to form a copolymer. Therefore, the product obtained by the present invention is not a modified phenolic resin but a black liquor-phenol-formaldehyde copolymer resin.

The first step of the process according to the invention consists is of mixing a black liquor with phenol and a base and letting the so obtained mixture reacts at high temperature. The order of addition of the above starting compounds is not important but it is preferred to add phenol to the black liquor first, and then potassium hydroxide in the form of a solution containing 45% by weight of potassium hydroxide. The so prepared mixture is heated to a temperature close to reflux, preferably at 95° C., for a period of time sufficient to initiate reaction between the black liquor and phenol. Such a period is, for example, 1 to 2 hours.

As aforesaid, any kind of black liquor may be used. However, use is preferably made of sodium carbonate black liquor with a pH greater than 9 and a solid content equal to or higher than 40% by weight. Indeed, it has been found that the sodium salts present in the sodium carbonate black liquor helps to stabilize the high molecular weight polymer resin that is being formed. It is known that the viscosity of any thermoset resin is not stable at ambient temperature. The rate of polymerization decreases as the temperature decreases. At ambient temperature and at a high pH, the resin will undergo further polymerization. The presence of sodium salts, especially sodium acetate and sodium bicarbonate, helps buffer the effects of the pH and slow down the polymerization process, thereby keeping the viscosity rise minimal. If excess alkalinity is added to the modified resin, then the viscosity increases and the resin is subjected to rapid polymerization.

The addition of a base to the mixture is actually an essential feature of the invention. Indeed, although the black liquor has a pH greater than 7, the reaction is extremely slow when phenol and formaldehyde are added to it. The salts that are in the black liquor do not catalyze the requested degree of polymerization in a reasonable period of time. The pH required must be higher than 11 and only the addition of a base may accomplish it.

In practice, any base may be used provided that it actually catalyzes the reaction. However, use should preferably be made of inorganic bases since an organic base may not keep the polymer soluble in water to the same extent as an inorganic base.

It is known that the addition of an inorganic base, such as a solution containing 50% of sodium hydroxide, increase the pH of the mixture and thus increases the degree of polymerization. In most phenolic resins, sodium hydroxide is commonly used to catalyse the copolymerization. However, potassium hydroxide is also known cure the resin at a faster rate.

Therefore, in accordance with a preferred embodiment of the invention, use is preferably made of potassium hydroxide as a base. Potassium hydroxide is preferably used essentially because:

potassium is less electropositive than sodium;
since it is less electropositive than sodium, it attracts less water around it; and
since it attracts less water, it tends to be less bulky and interferes less with the polymerization rate.

The second step consists of cooling the mixture and adding a specific amount of formaldehyde into the mixture. The formaldehyde will react fast on ortho positions of the phenol and with available sites on the lignin contained inside the black liquor. A linear phenol containing some lignin molecules at specific position is then obtained.

When the temperature is increased to, for example 85° C., formaldehyde quickly reacts as mentioned above. The polymer increases in molecular weight but, as aforesaid, at this temperature, formaldehyde reacts very quickly and the heat from the condensation reaction dissipates. The polymer can cross-link if exposed to heat for a long time. However, to prepare a binder, such is not actually required at this stage. What is required is more formaldehyde.

The third step of the process according to the invention consists of adding more formaldehyde and more base, preferably potassium hydroxide. If only more formaldehyde is added, then the polymer will continue to build but the polymerization rate or degree of polymerization is slower at lower temperature. In order to decrease the energy required to react the polymer, an additional amount of the base, preferably potassium hydroxide, is added. At this point, the polymer at a temperature of say, 82° C., builds very fast. Therefore, control of the temperature is important. Otherwise, proper viscosity may not be achieved.

When the requested viscosity is achieved, such corresponding to a given molecular weight for the polymer, there must be an excess free formaldehyde in solution. This free formaldehyde is important when the resin is applied on the wafer or veneers, as will be explained hereinafter.

As aforesaid, the addition of formaldehyde is advantageously carried out twice, in two separate stages. The first stage which actually corresponds to the second step of the process according to the invention produces a polymer of low molecular weight distribution, while the second stage which corresponds to the third step of the process according to the invention enhances the degree of polymerization while leaving some excess formaldehyde behind. Indeed, a high degree of polymerization is required as are an increased alkalinity and an excess of formaldehyde to provide an exothermic reaction that promotes fast curing of the resin.

Such a two-stage processing is actually important. Indeed, the same processing could be made in only one stage.

However, such would not produce the same resin, and the resin obtained in one stage would not have the same advantages as the resin produced in two stages.

In use, the amount added in each stage, the temperatures at which the addition are carried out and/or the mole ratios of formaldehyde to phenol may vary depending on the user's needs. In practice, the mole ratio of formaldehyde to phenol preferably ranges from 1.7:1 to 3.5:1 for fast curing OSB core resin. More preferably, the mole ratio ranges from 2.8:1 to 3.2:1 to achieve better results in terms of curing time and stability (see the chart enclosed as FIG. 1).

In accordance with a preferred embodiment of the invention, the resin that has been obtained by the above process, is subsequently reacted with urea in a further step in order to tie up any free formaldehyde that would be in excess. The reason of doing this is that formaldehyde is known to be an irritant to the mucous membrane in quantities of less than 0.1%. Thus, urea must be added in sufficient amount to bring the free formaldehyde to levels of less than 0.1% in solution. In the press, at high temperatures and pressures, bound formaldehyde reacts with the resin and becomes involved in the final cross-linking.

In practice, such a reaction with urea is not essential and the resin will work without it. However, because of environmental concerns, urea should preferably be used to reduce formaldehyde emissions. It is worth noting that instead of urea, use could alternatively be made of any primary, secondary or tertiary amine capable of binding to formaldehyde, commonly known as a formaldehyde scavenger. More specifically, any chemical known for scavenging formaldehyde could be used as long as the desired characteristics and/or properties of the resin are maintained. In practice, urea is preferred because of its low toxicity and cost.

Of course, the amount of urea to be used is proportional to the free formaldehyde remaining in the resin. If the amount of free formaldehyde is reduced, so will be the required amount of urea.

In accordance with the invention, it has been found that when a resin is prepared as disclosed hereinabove with a high amount of sodium carbonate black liquor, the resin that is so prepared achieves and exceeds the Canadian Standards Association requirements for internal bond strength in the core of an oriented strand board (OSB). The following parameters are those required for forming the OSB panels:

| | |
|---|---|
| Press Cycle: | 180 seconds |
| Press Temperature: | 220° C. |
| Resin Dosage: | 2.5% to 3% on dry solids of resin |
| Panel Density: | 40 lbs/ft$^3$ |

The same resin can also be used for the manufacture of plywood with adjustments to pH and mole ratio.

With the high degree of sodium carbonate black liquor in the resin, the overall amount of phenol and formaldehyde can be reduced because the presence of lignin in the black liquor acts as a substitute. Also, due to the high degree of polymerization achieved, the salts in the black liquor help to stabilize the polymer at ambient temperature (see again the chart enclosed as FIG. 1). The resin has the ability to exceed the 50 psi internal bond strength in the core of an OSB panel, that has an approximate density of 40 lbs/ft$^3$, and with a dry solid resin content of 2.5% to 3.0%. When a 100% phenolic resin is used on the surface wafers of an OSB board, the black liquor-phenolic core resin, containing the sodium carbonate black liquor, has a comparable water absorption, thickness swell and modulus of rupture (MOR), as that of a 100% phenol-formaldehyde core resin. As a result, the black liquor-phenol formaldehyde resin according to the invention has the required adhesion strength to meet the CSA and ASTM requirement for a core resin in OSB.

Figure 2:
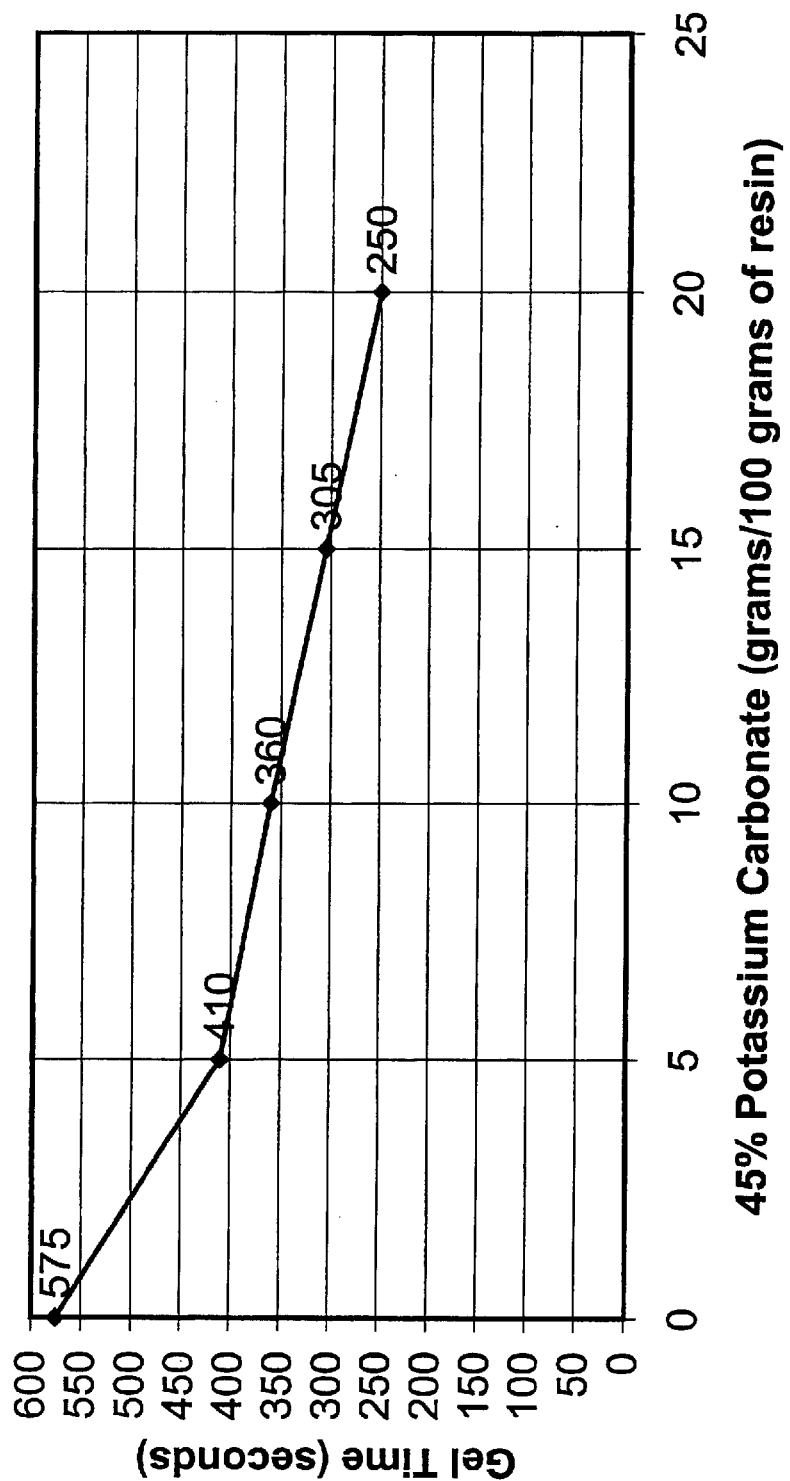
FIG. 2 is another chart giving the gel time as a function of the amount of potassium carbonate solution used for the preparation of a black liquor-phenol-formaldehyde resin according to the invention.

In accordance with the invention, it has also been found that a solution containing carbonate ions, preferably potassium carbonate, may advantageously be added to the resin at ambient temperature. Such an addition will cause resin to cure at a faster rate which is actually proportional to the amount of the potassium carbonate solution added. Such a rate can range from 5 to 20 parts of the solution that is of 45% potassium carbonate per 100 parts of resin (see the chart enclosed as FIG. 2). This addition can be made just before the resin is applied onto the wafers or veneers. The potassium carbonate helps to further promote the rapid curing of the resin by lowering the energy required to initiate an exothermic reaction in the press. Depending on the amount of potassium carbonate added, the cure time for the resin can be decreased by 30% to 50%.

The use of a solution of potassium carbonate is preferred because of the advantage of using potassium as outlined hereinabove. However any carbonate containing material whether organic or inorganic salts could be used. In this process, it is the presence of carbonate groups that is important, since it "facilitates" curing of the resin.

Once again, it is worth emphazing that most of the ingredients that are important to form the resin, are within the black liquor itself. The presence of lignin is important for the copolymerization with phenol and the salts help to stabilize the final resin. The process is versatile at this point, since one can either add only the phenol into the black liquor at the beginning of the reaction and bring the temperature to atmospheric reflux for 1 to 2 hours, or one can add phenol and potassium hydroxide to the black liquor at the beginning and bring the mixture to atmospheric reflux for 1 to 2 hours. As a matter of fact, the most important part of the process lies in when and how much formaldehyde is added and in how much base is added.

Conventional test methods were used for determining the properties of an example of resin according to the invention during and after its preparation. These test methods are standard methods of the Structural Board Association. Measurement of viscosity helps in determining the degree of polymerization of the resin.

In the following examples, a 95% of paraformaldehyde was used rather than liquid formaldehyde (formalin), the difference lying in the water content, not in the formula. Indeed, paraformaldehyde which is a polymeric form of formaldehyde, is known to break in water and gives formaldehyde which, when in solution, is called "formalin". By "95% paraformaldehyde", there is meant a mixture containing 95% of paraformaldehyde and 5% of other materials consisting essentially of water and minor amount of impurities. In practice, any grade of paraformaldehyde can be used, but preferably use should be made of 91% and 96% paraformaldehyde. Alternatively, any concentration of formalin higher than 37% should be used. If formalin is used, then the amount of solid material in the resin will decrease due to the added water content.

The black liquor that was used in the examples had a solid content of about 40%. In practice, the black liquors that are produced in mills have solid contents that may vary from 15% to 80% depending on the conditions of the mill on a particular day or the equipment available. The percentage of solids given hereinabove refers to all the solids (non-volatile materials) contained within the black liquor. Of course, the amount of lignin and salts will vary with the percent solid content of the black liquor.

Details of the process used for preparing the modified resins exemplified hereinafter are outlined in the examples below.

EXAMPLE 1

274 g of phenol was melted and 1000 g of sodium carbonate black liquor was added to it. The mixture was heated to 106° C. to 108° C. close to reflux. After the mixture had refluxed for 60 minutes, it was then cooled to 80° C. and 135 g of a solution containing 45% potassium hydroxide was added. The temperature was increased and held at 92° C. to 95° C. for 60 minutes. After 60 minutes, the mixture was cooled to 80° C. and 127 g of 95% paraformaldehyde was added while maintaining the temperature in a range of 75° C. to 80° C. The resin was held at 80° C. to 85° C. for 60 minutes, after which it was cooled to 65° C. At 65° C., 136 g of the solution containing 45% of potassium hydroxide was added again and 150 g of 95% paraformaldehyde was also subsequently added. The temperature was increased to 80° C. to 82° C. and maintained for a viscosity of 1000 to 1200 cps at 25° C. for 90 minutes. Then, the resin was cooled to 65° C. and 172 g of urea was added. Once the urea was dissolved, the resin was cooled to 20° C. and 15 parts of the solution containing 45% of potassium carbonate was added to 100 parts of resin.

The properties of the so prepared resin using paraformaldehyde at a concentration of 95% and a black liquor containing 40% by weight of solids, are as follows:

| | |
|---|---|
| % Solids: | 50% to 53% |
| Specific Gravity (g/mL): | 1.23 to 1.26 at 25° C. |
| pH: | 11 to 12 |
| Viscosity (centipoises): | 200 to 350 |
| Gel Time (seconds): (@ 120 to 122° C.) | 200 to 400 |

The properties of OSB panels made with the black liquor-phenolic resin on core wafers and a 100% phenolic resin on surface wafers, under the pressing conditions listed below, are as follows:

| | | |
|---|---|---|
| Press Temperature: | | 220° C. |
| Press Cycle: | | 180 seconds |
| Before Resin and Wax Surface Wafer Moisture: | | 7% |
| Core Wafer Moisture: | | 3% |
| Mat Composition | Face: | 40% |
| | Core: | 60% |
| Resin Dosage | Face: | 3% |
| | Core: | 3% |
| Wax Dosage | Face: | 1% |
| | Core: | 1% |
| After Resin and Wax Surface Moisture: | | 9% |
| Core Moisture: | | 5% |
| Target Panel Density: | | 40 lbs/ft$^3$ |
| Mat Dimensions: | | 30 in × 30 in |
| Target Panel Thickness: | | 7/16 in |
| Internal Bonds: | | 51 to 62 psi |
| MOR (dry): | | 5000 to 6000 psi |
| MOR (wet): | | 2000 to 3000 psi |
| MOE: | | 615000 to 720000 psi |

EXAMPLE 2

To 1000 grams of sodium carbonate black liquor, 274 grams of phenol were added together with 135 grams of a 45% potassium hydroxide solution. The mixture was heated to 92° C. to 96° C. and held there for 60 minutes. After 60 minutes, the mixture was cooled to 80° C. and loaded with 127 grams of 95% paraformaldehyde while maintaining temperature of 75° C. to 80° C. The reaction mixture was held at 80° C. to 85° C. for 60 minutes and then cooled to 65° C. At 65° C., 136 g of 45% potassium hydroxide solution and then 150 g of 95% paraformaldehyde were added while keeping temperature between 75° C. to 80° C. The temperature was then increased to 80° C. and maintained in a range of 80° C. to 82° C. at a viscosity of 1000 to 1200 cps for 90 minutes. Then, the resin was cooled to 65° C. and 172 g of urea was added to it. Once urea was dissolved, the resin was cooled to 20° C.

The so obtained resins disclosed in the above examples have proved to be fast reacting resins. In order to accelerate the curing process in the press, 15 parts of a 45% potassium carbonate solution was also added to 100 parts of the above resins. Such was done just before the formation of the panels and this addition has proved to be particularly efficient. The preferred range of 45% potassium carbonate solution addition was determined to be 10 to 15 parts into 100 parts of resin and is effective for addition into OSB core resins that do not contain any black liquor.

What is claimed is:

1. A process for preparing a black liquor-phenol formaldehyde thermoset resin suitable for producing oriented strand board panels, comprising the steps of:
    a) mixing a black liquor with phenol and a base and letting the obtained mixture reacts at high temperature;
    b) cooling the mixture obtained in step a), then adding to it formaldehyde, in an amount corresponding to part of the total amount of formaldehyde required to obtain the desired resin, the mole ratio of said total amount of formaldehyde to phenol ranging from 1.7:1 to 3.5:1, and letting the obtained mixture react; and
    c) adding the remaining amount of formaldehyde and a base to the mixture obtained in step b) in order to obtain the desired resin, such remaining amount being selected so that there is an excess of free formaldehyde in solution when the desired resin is obtained.

2. The process of claim 1, wherein in step a):
    the black liquor, phenol and base are mixed altogether and then the obtained mixture is heated and allowed to react.

3. The process of claim 2, wherein the black liquor is a sodium carbonate black liquor.

4. The process of claim 3, wherein the base is a potassium hydroxide solution.

5. The process of claim 4, comprising the additional step of:
    d) reacting the resin obtained in step c) with urea.

6. The process of claim 5, comprising the additional step of:
    e) prior to using the resin as a binder, adding a potassium carbonate solution to said resin so that it may cure faster.

7. The process of claim 1, wherein in step a):
    $a_1$) the black liquor is first mixed with phenol;
    $a_2$) the mixture obtained in sub-step $a_1$) is heated;
    $a_3$) the base is then added to the mixture obtained in sub-step $a_2$); and
    $a_4$) the mixture obtained in sub-step $a_3$) is allowed to react.

8. The process of claim 7, wherein the black liquor is a sodium carbonate black liquor.

9. The process of claim 8, wherein the base is a potassium hydroxide solution.

10. The process of claim 9, comprising the additional step of:
   d) reacting the resin obtained in step c) with urea.

11. The process of claim 10, comprising the additional step of:
   e) prior to using the resin as a binder, adding a potassium carbonate solution to said resin so that it may cure faster.

12. The process of claim 1, wherein the black liquor is a sodium carbonate black liquor.

13. The process of claim 12, wherein the black liquor, has a solid content higher than 40%.

14. The process of claim 13, wherein the black liquor is used in an amount of 40% and higher by weight of the total weight of the resin.

15. The process of claim 14, wherein the base is a potassium hydroxide solution.

16. The process of claim 15, comprising the additional step of:
   d) reacting the resin obtained in step c) with urea.

17. The process of claim 16, comprising the additional step of:
   e) prior to using the resin as a binder, adding a potassium carbonate solution to said resin so that it may cure faster.

18. A black liquor-modified, phenol formaldehyde thermoset resin obtained by the process of claim 1.

19. black liquor-modified, phenol formaldehyde thermoset resin obtained by the process of claim 6.

20. A black liquor-modified, phenol formaldehyde thermoset resin obtained by the process of claim 11.

* * * * *